MAGNETIC CORE TIME BASIS DEVICES

Filed April 30, 1958

Inventor
Jean Auricoste
By Ralph B. Stewart
Attorney

United States Patent Office 3,070,781
Patented Dec. 25, 1962

3,070,781

MAGNETIC CORE TIME BASIS DEVICES

Jean Auricoste, Paris, France, assignor to Societe d'Electronique et d'Automatisme, Courbevoie, Seine, France Filed Apr. 30, 1958, Ser. No. 732,008
Claims priority, application France May 2, 1957
14 Claims. (Cl. 340—174)

The present invention relates to binary data handling and processing systems using saturable magnetic cores having a substantially rectangular hysteresis loop.

An object of the invention is to provide timing signal generators for binary data handling systems in which the activation (and in most cases the de-activation) is controlled from the change-over action of at least one electrical contact which may be actuated either manually or automatically without having any definite phase and/or duration relation with respect to the internal synchronizing signal of the data handling system. The timing signals produced by the said generators are made to cooperate with the said internal synchronizing signal and, in some cases, to partly at least combine with the said synchronizing signal, since the activation and the de-activation of the said generators actually correspond to certain oportunities of the programme of operation of the concerned system.

A further object of the invention is to provide such timing signal generators which rely for their operation upon the same properties of saturable magnetic cores of substantially rectangular hysteresis loop as are relied upon in the data handling system, thereby delivering output signals which may be effective for controls of magnetic core circuits in the said data system and thereby being further capable of making use of the said internal synchronizing signal for producing the timing signals.

The invention will be described as applied to one specific embodiment of such data handling and processing systems of the type above specified though of course it is not restricted to that particular embodiment, as will be hereinafter explained. For the purposes of the description, reference is made to the accompanying drawings, wherein FIG. 1 shows part of a cascade arrangement of magnetic core stages which may be used in a binary data processing system according to this invention;

FIG. 2 and FIG. 3 respectively show two forms of a magnetic-core stage in this system for performing certain elementary logical operations;

Figure 5:
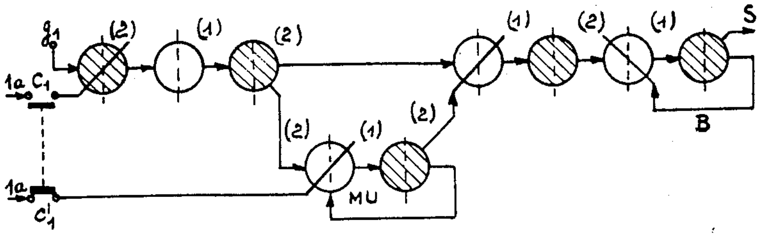
FIG. 5 shows a generator according to the invention and adapted to deliver a single output pulse in response to a change-over of condition of an electrical contact.
Figure 6:
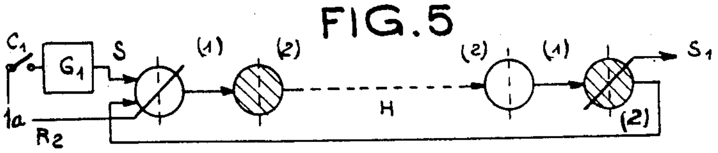
Figure 7:
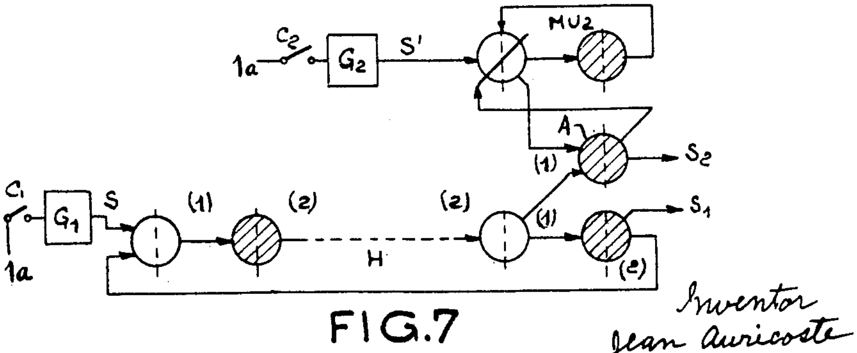

FIG. 6 shows a clock signal generator controlled from the single-pulse generator of FIG. 5; and FIG. 7 shows a more complex arrangement according to the invention, incorporating the arrangements of both FIGS. 5 and 6, so that the single pulse generated by an arangement according to FIG. 5 may be delivered to the load or output circuit thereof under the control of one of the clock pulses produced by an arrangement according to FIG. 6.

The arrangements of FIGS. 5 to 7 inclusive are useful in the designing of any required time-base operating under external controls in a binary data processing system, the internal control of which is assumed by a synchronizing signal source which does not depend upon such external controls.

Figure 1:
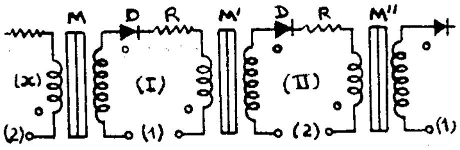

Referring to FIG. 1, a portion of a cascade arrangement of three magnetic cores M, M' and M'' is shown, wherein each magnetic core is assumed to present a substantially rectangular hysteresis loop and therefore to present two stable magnetic states or conditions, a positive or P remanent induction condition, and a negative or N remanent induction condition. Each core in FIG. 1 is provided with an input winding of N*i* turns and an output winding of N*o* turns, with N*o* higher than N*i*. The cascade arrangement of these cores is obtained by means of interconnection networks such as (I) and (II), each of which comprises an output winding of a core which acts as an "emitter" core with respect to the network, and an input winding of a core which acts as a "receiver" core in the said network, the two windings being serially connected through a unidirectionally conducting element such as a diode D and, preferably though not imperatively, a series resistor R is included in the circuit for damping stray oscillations therein. In the concerned system, each network is fed from a pair of terminals with a voltage supply of alternating character, the phases (1) and (2) of which are regularly alternated throughout a cascade, so that two successive networks will alternately receive successive "useful" alternations of this supply voltage for the operation thereof, the direction of this "useful" alternation being of course determined by the direction of connection of the diodes D in these networks. Thus, the "useful" alternation of the supply voltage in a network is that alternation which produces current in the network, the current flowing through the output winding included in the network and tending to change the core of this winding from the P to the N condition, and acts upon the input winding included in the said network and tends to bring the magnetic core thereof from N to P, if the current value is sufficiently high.

In such a system, it will be conventionally assumed that the digital values 0 and 1 will be represented by the stable magnetic conditions of the cores but, of course, in certain stages, it will be the condition P which will represent the digital value 1 whereas in other stages this digital value 1 will be represented by the N magnetic condition of the cores.

As will clearly appear below, it is the voltage supply of the interconnecting networks which functions as the main internal synchronizing signal. This voltage may be of sine wave-form, which is the most simple to obtain, but it may as well, when desired, be a symmetrical saw-toothed, or rectangular, or trapezoidal wave-form. Such a signal ensures the control of the progression of the binary codes throughout the stages of such a system. Of course, other arrangements are known wherein the interconnecting networks do not include any connection to the control source, and in such arrangements the progression of the codes is effected by application of separate control currents to distinct control windings on the magnetic cores thereof. Usually these control currents are of a rectangular wave-form. Quite obviously, the invention may be applied as well to such control current systems as to the voltage controlled system shown herein.

Referring back to the circuit of FIG. 1, the operation thereof may be explained as follows:

When an information bit incoming at (*x*) on the first magnetic core M (the left-hand one in the drawing) is such that the magnetic condition of this core is N at the end of a useful alternation of phase (2) of the supply, the next following useful alternation of phase (1) in the network (I) produces therein an electrical current which is fully transmitted to the input winding of the second magnetic core M' and which brings this core to the P magnetic condition (assuming this core was in the N condition thereof). At the next following useful alternation of phase (2) in the network (II), the current flowing through the output winding of this second core M′ will serve to reset it back to the N condition so that in this network this current will be restricted to the coercitive value of the core, and the third magnetic core M″ of the cascade will remain at the N condition thereof. It is obvious that only in this period a new information bit $x$ can be applied to the first magnetic core M of the cascade so that the system is of a "two-core per bit" type. It is further obvious that an information bit of a definite digital value alternately appears in the true representation, $x$, thereof and in the complementary representation, $\overline{x}$, thereof when progressing from core to core in such a cascade.

Figure 2:
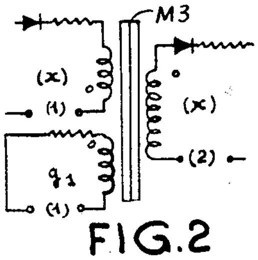

It is however possible to obtain the same representation in two successive cores when, according to FIG. 2, the incoming information bit is applied to an input winding which acts as an inhibiting one with respect to the core whereas another input winding permanently receives a signal representing the digital value 1 for a normal action on this core. Such a signal may easily be obtained from a circuit of the same constitution as any other interconnecting network but for the omission therein of any output winding from another core. Such a circuit is shown at $g_1$ in FIG. 2. It is of course actuated in phase with the incoming information signal. Of course, in such an arrangement, it is necessary that the incoming information signal having a predetermined digital value appear as a high value current for this digital value for the inhibiting action thereof on the core. The logical operation in such a stage obviously is $\overline{(1.\overline{x})}=x$.

Figure 3:
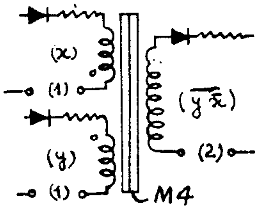

When, instead of a 1-value source $g_1$, in such a stage, another information signal $y$ is applied to the input winding normally acting on the core, as shown in FIG. 3, the output signal from this stage will represent the result of the logical operation $\overline{(y.\overline{x})}$.

Figure 4:
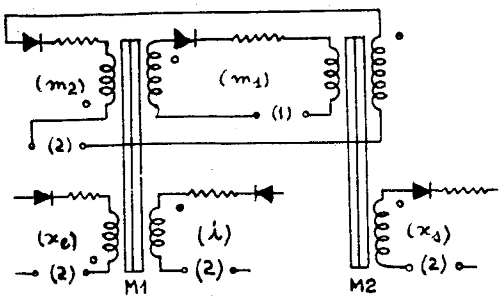
FIG. 4 shows a diagram of a one-digit store which is used in such a system.

A one-digit store is obtained, according to FIG. 4, by first connecting two cores M1 and M2 by means of a normal coupling network ($m_1$) and by secondly connecting back the output of the core M2 to one input of the core M1 by a further coupling network ($m_2$). The core M1 is provided with an information receiving winding from a network ($x_e$) and an output winding may be provided on either core, for instance on the core M2 as shown in FIG. 4, in an output network ($x_s$). Clearing the store may be effected by the activation of an inhibiting network, for instance on core M1 from an inhibiting signal incoming in the network ($i$).

Assuming that the introduction of a digital value 1 at $x_e$ brings the core M1 to the P condition thereof, this core will then be reset to N in the next following useful alternation of phase (1) by action of circuit (M1), and the core M2 will remain at N; at the next useful following alternation of phase (2), the core M1 will be set to P by the back-acting network (M2), and so forth. When an inhibition signal ($i$) arrives in phase (2), the core M1 is maintained at N and, during the next following alternation, it is the core M2 which is brought to P by the action of the coupling network ($m_1$) so that, at the following useful alternation of phase (2) the core M1 is maintained at N whereas the core M2 is reset at N; and so forth.

Referring back to the object of the invention, it is primarily intended to provide such devices that may be activated by a change-over operation of a mechanical or electromechanical contact for delivering a single response pulse which will then activate such control and programme devices as the time-base or the like in a binary data handling or processing system which operates to control the conditions of external equipments producing this change-over, as well as other ones the actions of which will further interfere with the said externally controlled devices.

Such single pulses cannot be obtained directly from the contacts as this will impose drastic conditions upon the mechanical structure of the switch contacts, as well as upon the structure of part at least of the system proper: for instance, it is of course of advantage that the system possesses an independent synchronization with respect to the external equipments so that, for instance, the frequency of operation of the system must not depend upon these external equipments, and vice versa.

The invention is mainly based upon the fact that by an appropriate choice of the number of successive stages in a cascade of magnetic-core stages, the output will deliver a lower value of current for a definite input condition of the cascade and a higher value of current for a reverse input condition of the said cascade. Of course, this will only enable the switching of the output from a series of digital values 1 to a series of digital values 0, if the input condition is made dependent of the change-over of a mechanical contact. The invention then provides for combining such a cascade of magnetic cores with a magnetic core one-digit store controlled from an intermediate stage of such a cascade for changing the content thereof according whether this intermediate stage delivers a current of a higher or a lower value and to ensure an inhibition control of a further stage of the said cascade from the output of the said one-digit store, whereby, after a first change of condition of the output of the said cascade resulting from a change of condition of the input thereof, an automatic reset to the first output condition thereof is obtained from the control of the said one-digit store; consequently and as required, this system operates in response to a change of condition of the input of the cascade, and independently of the time duration of this changed condition, to produce a single pulse changed condition at the output of the said cascade.

From this arrangement, a clock signal generator is derived by merely controlling by this single pulse output the activation of a loop register of an appropriate number of magnetic-core stages.

From this clock generator further single-period output generators under control of further mechanical control contacts may then be controlled in order that the outputs of the said further single response generators may occur in definite time relation with respect to the "minor cycles" defined by such a clock; and so on, for the design of any required time-base arrangement, of external control, in the concerned binary data handling and processing system.

The arrangements shown in FIGURES 1 to 4 are prior art, back-ground art, with respect to the present invention as represented in FIGURES 5 to 7. FIGURE 1 is disclosed and claimed in co-pending application of Raymond et al. Ser. No. 671,854, filed July 15, 1957.

FIG. 5 shows a generator delivering a single pulse signal in response to the change-over of a mechanical contact $c_1$ (work contact), $c'_1$ (rest contact) of a switch which is not otherwise identified since further identification is not necessary for the purposes of the invention. The circles in FIG. 5, as well as in the other FIGS. 6 and 7, represent magnetic-core stages with their respective inputs and outputs indicated by arrows; an inhibiting input is marked by a diagonal line traversing the concerned circle. For a better understanding, alternate circles of the cascade are cross-hatched to represent stages which are read-in in phase (1) and read-out in phase (2) of the supply whereas the clear circles represent stages which are read-in in the phase (2) and read-out in the phase (1) of the supply.

The cascade of magnetic-core stages in FIG. 5 comprises the minimum number of magnetic cores, i.e. seven of them for an optimum design of the arrangement with a two-core per bit system. The direction of progression is from left to right in the drawing. The first core receives a continuous series of digital value-1 signals from generator $g_1$ as an input signal and also receives a value-1 inhibition signal from source 1$a$ when the work contact $c_1$ is closed. This inhibition signal is not applied to the core when the contact $c_1$ is open. One output of the third core is directed to an activating input of a one-digit store MU as well as to the input of the fourth core and this fourth core stage receives an inhibition signal from MU when this store contains a digital value 1. The input stage of one-digit store MU is inhibited from source 1*a* as long as the rest contact $c'_1$ is closed. An output of the seventh core stage is fed back as an inhibiting signal to the sixth core stage through lead B. The output of the arrangement is taken from this seventh core stage as shown at S.

Considering first the straight cascade from the first to the seventh magnetic-core stage without considering any inhibition therein but that applied to the first core stage when $c_1$ is closed, the operation is as follows:

When $c_1$ is open, the magnetic conditions of the cascade is the following one at each end of the phase (1) of the supply: P N P N P N P; consequently, in phase (2) the output signal S will be represented by a current of the coercitive and restricted value useful for setting back the seventh core to the N condition thereof. From the utilization circuit, not shown in FIG. 5, this will represent an output of digital value 0.

When $c_1$ closes, the magnetic conditions of the cascade progressively become N P N P N P N and will be then maintained, so that in phase (2) the output signal S will be represented by a current of unrestricted value, the meaning of which will be the digital value 1 for the utilization circuit (not shown).

The introduction of the one-digit store MU in this operation modifies it as follows:

In the cleared or zero condition of the store MU, the first core thereof remains at the N magnetic condition whereas the second core changes from N to P and back; in the activated or one condition of the store, these conditions are reversed, the second core remaining at N and the first passing through the cycle from N to P and back. Consequently in the cleared condition of store MU, no inhibition exists on the fourth core of the cascade whereas, in the activated condition of the store, this inhibition does exist at each useful alternation of phase (2) of the supply.

When the contact $c_1$ is open, this store MU has no action on the above-defined operation of the cascade. When the contact $c_1$ is closed, and consequently the contact $c'_1$ opened, which removes the inhibition on the input of the one-digit store, the first 1-value signal issuing from the third core of the cascade activates the one-digit store and simultaneously is transmitted to the fourth core of the cascade for a further transmission to the fifth core, and so forth to the seventh stage. However, the second 1-value signal reaching the fourth core of the cascade arrives at a time when this core is inhibited by the output of the activated one-digit store MU and this fourth core remains in the N magnetic condition thereof. Consequently, after the 1-value signal has issued from the last stage of the cascade, the next following 1-value signal from $g_1$ is blocked at the fourth stage of the cascade and the output at the 7th stage of the cascade marks 0. Thus, a single period 1-value signal is delivered by the arrangement upon closing of contact $c_1$, as required for the purpose of the invention.

When the contact $c_1$ re-opens and the contact $c'_1$ closes, the one-digit store MU is de-activated or cleared and the operation of the cascade returns to normal, with a zero output signal. Apparently, the arrangement would necessitate only five core stages in the cascade as, in the above described operation, the outputs of the fifth and seventh cores are identical. However, it has been found that in actual practice a "false" signal of digital value-1 may occur both at the closure and at the opening of the contact $c_1$ in such an arrangement. This may be due to rebound of the mechanical contacts. Certainty of operation of the arrangement is ensured by providing the two last stages of the cascade with the feedback indicated at B therebetween. If a stray signal reaches the next to the last stage, viz. the sixth stage of the cascade, for driving the magnetic core thereof to the P condition, this effect will be counterbalanced by the issuance of the 1-value signal from the 7th core stage.

This arrangement may be used mainly for driving a clock generator device H, as shown in FIG. 6. The single pulse output of the arrangement of FIG. 5, as represented at $G_1$ in the said FIG. 6, activates the clock signal device proper which comprises a dynamic register H of a predetermined number of pairs of successive magnetic-core stages connected in a looped arrangement from the last to the first stage of the clock. Once the clock is activated, it will continue in an obvious way to carry therein the signal from $G_1$ until the first stage thereof is inhibited at $R_2$ by a clearing signal supplied from any suitable part of the system to which these clock signals are delivered.

But, of course, once such a "primary" clock is activated, it may be required that other mechanical contacts act for further delivery of single pulse signals and these signals may be required to have certain definite phase relations with respect to the clock signals. It may for instance be assumed that such additional and phased single pulse signals activate "secondary clocks" in the control equipments of the concerned system. In FIG. 7 is shown an elementary arrangement in which the signal delivered by a generator $G_2$ of the type shown in FIG. 5 has its output value-1 signal effectively delivered in synchronism with a predetermined clock signal from a clock arrangement according to FIG. 6 and, as shown, with the clock signal delivered by the next to the last magnetic-core stage of the clock H. This is obtained by inserting a one-digit store MU2 between the output S′ of the single pulse signal generator $G_2$ (controlled from the contact $c_2$) and an additional magnetic core A from which is taken the actual output $S_2$ of this second generator $G_2$, and by controlling one-digit store MU2 and magnetic core stage A as follows: The output of A is fed back as an inhibiting signal to the first core of store MU2, the output of which core constitutes one of the input signals for A; the other input signal for A is taken, for instance, from the next to the last magnetic-core stage of the clock H, so that the core A and the last core of this clock are driven in like phase relation for the production of the signals $S_2$ and $S_1$ respectively. In the cleared condition of the one-digit store MU2, it is the first core thereof which remains at N and the second core which describes the cycle from N to P and back. Consequently, as long as the said store remains in the zero condition thereof, the core A will be systematically brought to the P condition thereof at each useful alternation of phase (1). Further, when the clock does not mark the time instant defined by the next to the last stage thereof, this stage is also maintained at N and the output thereof confirms the action of the output of the cleared one-digit store on the core A. Once at each "minor cycle" of the clock, the said next to the last core is brought to P condition and the output current therefrom becomes of the lower value. However, as long as the store MU2 marks zero, this has no action on the core A.

When the generator $G_2$, at any time of the minor cycle, delivers an output signal which represents a digital value 1, the condition of the store MU2 changes and from this period it is the first core of the store which passes through its hysteresis cycle whereas the second core of MU2 is maintained at N. However, as long as the next to the last core of the clock is not controlled by the value-1 signal circulating therein, the output current from this stage remains at a higher value which maintains the core A in the N magnetic condition. But when this core of the clock receives the said value-1 signal, it changes to P and the current therefrom is then at the lower value for the actuation of the core A, and so is the current from the first core of the activated store MU2. Consequently, the core A will remain at N and the reading out thereof delivers a value-1 signal at the output $S_2$, in phase with the read-out value-1 signal from the last core of the clock H at $S_1$, which is the required result of the arrangement.

Further, this value-1 signal will inhibit the operation of the first core of MU2 and thus produces the clearing thereof.

What is claimed is:

1. A single pulse signal generator actuated by the change-over of a mechanical contact comprising the combination of a cascade arrangement of magnetic-core stages comprising at least five stages, at least the first and fourth stages including an inhibition input, a first source of digit value-1 signal applied to the first stage of the said cascade at the actuation input thereof, a second source of digit value-1 signal connected to an inhibition input of the said first stage through said mechanical contact upon the closure thereof, and a one-digit store having an actuation input controlled from the output of the third stage of the said cascade and having its output applied to an inhibition input of the fourth stage of the said cascade.

2. A combination according to claim 1, and including a second contact complementary controlled with respect to the first contact and operating upon the closure thereof to supply value-1 signals to an inhibiting input of the first core of the said one-digit store.

3. A combination according to claim 1 and wherein two further stages the first of which including an inhibition input are added to the said cascade, and a feedback connection effected from the output of the second of these additional stages to said inhibition input of the first of the said two additional stages.

4. A combination according to claim 1 and wherein the output of the last stage of the said cascade is connected to an activation input of a shift register comprising an even number of magnetic-core stages and a feedback loop from the last to the first stages of said shift register.

5. A combination according to claim 4, wherein there is provided a further single pulse value-1 signal generator controlled from a further mechanical contact, a one-digit store having an actuation input connected to the output of the said further single pulse generator and having an inhibition input, a magnetic-core stage having one input thereof connected to an output of the first magnetic-core of the said one-digit store and having another input thereof connected to the output of one of the magnetic-core stages of the said shift register, and a feedback connection from the output of the said two-input magnetic core stage to said inhibiting input of the first core of the said further one-digit store.

6. In a two-core per bit data processing system using saturable magnetic cores of substantially rectangular hysteresis loop, an externally controlled time-base generator activated from the change-over of at least one mechancial contact, comprising the combination of a least one shift looped-register of even number of magnetic-core stages, an activating generator for said register including a cascade of an odd number of magnetic-core stages the condition of the first of which is controlled from the said mechanical change-over contact, a one-digit store activated from the output of a magnetic-core stage of an odd rank in the said cascade in response to a predetermined condition of this change-over contact and means controlled by said one-digit store for inhibiting when activated a magnetic-core stage of even rank in the cascade adjacent the stage which has caused the activation of the said store.

7. An externally controlled time-base according to claim 6 wherein the first stage of the said cascade permanently receives a digit value-1 signal on the input thereof and receives an inhibiting signal at the closure of the said controlling mechanical contact.

8. An externally controlled time-base according to claim 7 wherein the said one-digit store receives an inhibiting signal at the opening of the said mechanical contact.

9. An externally controlled time-base according to claim 6 wherein the said cascade comprises five magnetic-core stages, the said one-digit store being controlled from the third stage and controlling the fourth stage of the said cascade.

10. An externally controlled time-base according to claim 6 and including means for feeding the output of a stage of odd rank back to an inhibiting input of the preceding stage, this latter stage being beyond the stage controlled from the said one-digit store in the said cascade.

11. An externally controlled time-base according to claim 10, wherein said last mentioned stages are the two last stages of the cascade.

12. An externally controlled time-base according to claim 6, and including a two-input magnetic-core stage, at least one stage of the said shift register having an output connected to one activation input of said two-input magnetic-core stage, a one-digit store including an inhibition input and having an output controlling the other input of the said two-input magnetic-core stage, a feedback output from said two-input stage to said inhibition input of the said one-digit store, and an activating generator for said one-digit store controlled from the change-over of a further mechanical contact.

13. An externally controlled time-base according to claim 12 wherein the said activating generator for the said one-digit store includes the combination of a cascade of an odd number of magnetic-core stages the condition of the first of which is controlled from the said mechanical contact, and a further one-digit store controlled from a stage of odd rank of the said cascade and controlling an inhibitor input of a further stage of even rank in the cascade.

14. An externally controlled time-base according to claim 12 and including a further shift-register having the input thereof connected to the output of the said two-input magnetic-core stage.

References Cited in the file of this patent

UNITED STATES PATENTS

| | | |
|---|---|---|
| 2,710,952 | Steagall | June 14, 1955 |
| 2,731,203 | Miles | Jan. 17, 1956 |
| 2,770,737 | Ramey | Nov. 13, 1956 |
| 2,816,278 | Whitely | Dec. 10, 1957 |
| 2,852,699 | Ruhman | Sept. 16, 1958 |